Patented May 19, 1931

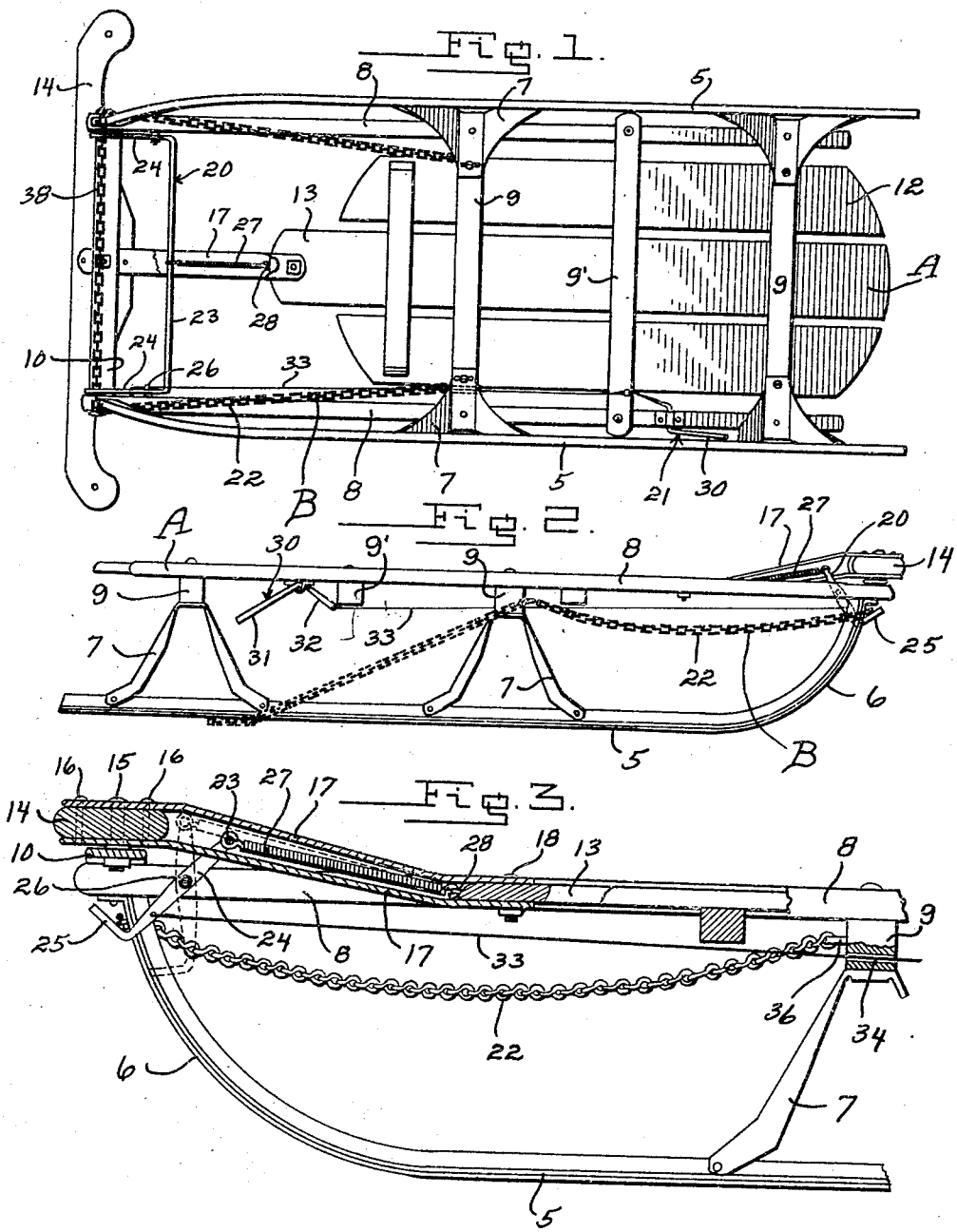

1,806,444

UNITED STATES PATENT OFFICE

JOHN Z. BOUTIN, OF TROY, NEW YORK

BRAKE FOR SLEDS

Application filed January 18, 1928, Serial No. 247,720. Renewed October 11, 1930.

The present invention relates to hand sleds and more specifically to a novel type of brake means for hand sleds.

The primary object of the invention is to provide means whereby the sled may be quickly brought to a stop as in cases of emergency or at any time when desiring to stop the gliding movement of the sled without requiring the occupant to create a dragging action with the feet.

A further object of the invention is to provide a braking means for sleds embodying means readily operable by the operator from any position the operator may be assuming on the sled.

A further object of the invention is to provide a novel braking means which may be readily installed upon existing types of steerable hand sleds without requiring any alteration being made to the sled construction.

A still further object of the invention is to provide a brake for hand sleds embodying a flexible braking element adapted to be releasably held in a raised inoperative position at the forward end of the sled and upon being released will automatically assume a position beneath the sled runners at a location relatively near the back end of the sled in a manner whereby the dragging action created by the braking element will not tend to cause the sled to deviate from its straight ahead position.

A still further object of the invention is to provide an improved type of braking means for steerable hand sleds which is so associated with the sled as to in no way interfere with the proper steering of the sled, and one wherein the brake apparatus will not interfere with the hands of the operator when moving to a braking position and thus allow for the operator to grasp the sled at any desired position.

Other objects and advantages of the invention will be apparent during the course of the following detailed description, taken in connection with the accompanying drawings, forming a part of this specification and in which drawings:

Figure 1 is a bottom plan view of a conventional type of steerable hand sled and showing the improved braking device applied thereto and in its normal inoperative position.

Figure 2 is a side elevation of the sled and showing in dotted lines the released position of the flexible braking element.

Figure 3 is an enlarged fragmentary longitudinal section thru the forward portion of the sled and showing the manner in which the brake is applied thereto.

Referring to the drawings in detail, and wherein similar reference characters designate corresponding parts thruout the several views, the letter A designates a conventional type of steerable hand sled and B the improved brake means for attachment to the sled A.

The hand sled A as illustrated is of the well known steerable type, and embodies the usual pair of metal runners 5 having upwardly curved forward end portions 6. Supported longitudinally above each of the runners 5 as upon suitable brackets 7 are a pair of side rails 8 which are connected at spaced intervals to transverse cleat members 9 and 9' and at their forward ends by a metal transverse rail 10 which also forms a tie for the upper ends of the curved portions 6 of the runners 5. As will be observed in Figures 2 and 3, the forward ends of the side rails 8 project for a slight distance past the upper terminals of the curved runner portions 6. It will also be observed that the cleat members 9 are mounted upon the upper end of the brackets 7. A seat 12 is supported upon the upper side of the cleat members 9 and 9' between the side rails 8 and embodies a number of longitudinally extending seat boards, the center one of which projects forwardly of the boards to each side thereof for providing a forwardly extending tongue 13.

The steering means for the sled comprises a guide bar 14 being pivotally connected at its enlarged central portion as by means of the pivot bolt 15 to the upper side of the transverse rail 10 at the longitudinal center of the sled. Rigidly connected at their forward ends to the upper and lower sides of the enlarged central portion of the guide bar 14, as by means of suitable rivets 16, and extending rearwardly at the longitudinal center of the sled are spaced superposed metal links 17 being pivotally connected at their rear portions to the upper and lower faces of the forward end of the tongue 13 as by means of a suitable pivot pin 18. Since the guide bar 14 is disposed above the side rails 8, and seat 12 is disposed in substantially a like plane with the side rails, it will be seen that the metal links 17 are inclined rearwardly and downwardly from the guide bar and advantage of this feature is taken when mounting the brake means upon the sled.

The steering of the sled is accomplished by exerting a forward pressure upon one end of the guide bar 14, and which thru the connecting links 17 bends the forward portions of the runners 5 to the opposite side of the sled from which the pressure is applied to the guide bar.

This bending of the runners 5 also flexes the forward end of the side rails 8.

The aforementioned construction of the sled A is all standard construction for the well known type of steerable hand sled, and forms no part of the present invention, the parts merely being defined for permitting of more clearly defining the specific application of the brake construction forming the subject matter of this invention.

Referring now to the specific construction of the brake means B, the same embodies a manually operable release means embodying a keeper 20 and trigger means 21; and a flexible braking element 22 normally held in a raised operative position by the keeper 20.

Referring first to the keeper 20, and which may be formed from a bar of relatively light metal, the same is of substantially U-shape in formation providing a cross rod 23 having right angularly extending pivot arms 24 provided at each end thereof and terminating in forwardly offset rest portions 25. The pivot arms 24 are flattened and pivotally connected to the inner side of the side rails 8 as by means of suitable pivot pins 26. The object in so flattening the pivot arms 24 will be subsequently explained. As will be observed, the cross rod 23 extends transversely of the sled between the superposed links 17 and the keeper is pivotally connected to the side rails at a location rearwardly of the guide bar 14. The pivot arms 24 are of such length that when the cross rod 23 is swung rearwardly the rest portions 25 will be disposed forwardly of the runner portions 6 and be inclined upwardly as in Figure 3 so as to form a substantially V-shaped pocket between the rest portions and upper ends of the runners for receiving the flexible braking element 22. Since the side rails and rest portions 25 both project forwardly from the upper ends of the runners it will be seen that the forwardly projecting ends of the side rails and the rest portions co-act with one another in a manner whereby the flexible braking element will be held by the keeper regardless as to any positioning of the sled which might have a tendency to cause the braking element to slip free of the keeper. Connected at one end to the central portion of the cross rod 23 between the links 17, is a contractile coil spring 27 which extends longitudinally between the links 17 and has its rear end anchored to the forward end of the tongue 13 as by a suitable fastening element 28 secured to the tongue between the superposed links. This coil spring 27 acts to normally exert a rearward pull on the cross rod and thus swing the rest portions 25 forwardly into a position for receiving the flexible member 22. By so disposing the spring between the links 17 it will be seen that the spring is disposed in a protected out of the way position and thus does not interfere with proper operation of the steering means.

By so having the pivot arms 24 flattened, such will allow for ready flexing of the arms and thus will not interfere with steering of the sled thru bending of the side rails 8 by the guide bar 14. Since the links 17 extend rearwardly and downwardly from the guide bar 14 it will be seen by observing Figure 3 that ample room is provided for arcuate swinging of the cross rod 23. When the keeper is swung to a position for releasing the flexible element 22 the rear edge of the guide bar 14 will act as a stop for the cross rod 23, and when the keeper is drawn to a holding position by the spring 27, the lowermost link 17 may act as a stop for the cross rod.

When the occupant is lying upon the sled and desires to release the brake means, it is merely necessary to press forwardly on the cross rod 23 for moving the keeper to a released position as shown by the dotted lines in Figure 3 and thus allowing the flexible braking element to be released from the rest portions 25.

Referring now to the trigger means 21, and which is intended to be operated for actuating the keeper 20 by a person when sitting upon the sled, the same embodies a bell crank lever 30 which is pivotally connected to the underside of one of the side rails 8 at a location relatively near the rear end of the sled. As will be observed in Figure 2, the outer arm 31 of the lever 30 extends rearwardly and downwardly from the pivot point of the lever, while the inner arm 32 extends forwardly and downwardly from the pivot point of the lever. Connected to the free end of the arm 32 is a wire 33 which preferably extends thru a guide opening 34 provided in the foremost cleat 9 and has its forward end connected with one of the pivot arms 24 at a location below the pivot 26. Thus it will be seen that upon exerting an upward pull on the operating arm 31 that the wire 33 will be drawn rearwardly and thus actuate the keeper 20 for releasing the flexible braking element 22. By so connecting the wire 33 to the innermost arm of the bell crank lever, such disposes the wires at a location whereby the same will not interfere with proper gripping of the side rails 8.

Referring now to the flexible braking element 22, the same is preferably in the form of a link chain having its ends anchored as by means of suitable fastening elements 36 to the forward side of the foremost cleat 9 at a location spaced a substantial distance inwardly from the ends of the cleat. The chain 22 extends from the anchoring members 36 outwardly of the runners 5 and is of sufficient length to have its medial portion extend across the runners at the upper end of the curved portions 6 to be engaged by the rest portions 25 of the keeper. When the intermediate portion of the chain is looped over the rest portions 25 at the forward end of each of the runners 5 it will be seen that the transverse portion 38 of the chain as in Figure 1 extends beneath the rail 10 while the side portions of the chain extend longitudinally beneath the side rails 8 and in a sufficiently elevated position as to be disposed out of possible contact with the snow or surface over which the sled is traveling. As will be observed, the chain 22 is anchored to the sled at a location substantially midway the length of the runners 5 and thus at a location whereby when the chain is released the same will move to a position well behind the transverse center of the sled and at a location substantially beneath the position of an occupant upon the sled. When the braking element is in a braking position, the entire transverse portion of the chain, that is, the portion extending transversely of the sled from runner to runner, will have a dragging action for retarding forward movement of the sled and thus the braking action does not merely rely upon that portion of the chain which is disposed directly beneath the bearing surfaces of the runners. When the keeper is released, the chain will drop by gravity and be carried rearwardly beneath the runners to a dragging position relatively near the rear ends of the runners and thus not have a tendency to cause the sled to tip forwardly or to deviate from its forward movement. By so having the ends of the chain anchored to the front side of the transverse cleat, the chain when in a braking position extends about the ends of the cleat and thus exerts a lateral strain on the anchoring members 36 which will not be apt to cause the anchoring members to be disconnected from the cleats. This anchoring of the chain inwardly from the ends of the cleats also prevents the chain from interfering with the occupant's hands should the occupant be holding to the side rails 8.

From the foregoing description it will be apparent that a novel and simple brake attachment for steerable hand sleds has been provided which may be readily applied to sleds of existing construction without requiring any alterations whatsoever to the sled, and which brake means is of such construction as to not in any way interfere with the usual operation of the sled. It will also be apparent that a novel arrangement has been provided whereby the flexible braking element may be released by an occupant assuming different positions upon the sled.

Changes in detail may be made to the specific form of the invention herein shown and described, without departing from the spirit of the invention or the scope of the following claims.

I claim:

1. The combination with a steerable hand sled comprising a pair of runners and side rails arranged longitudinally above each runner, of a brake for the sled comprising a flexible braking element anchored at opposite ends to the intermediate portion of the sled to extend about the sled runners, a keeper for releasably retaining the braking element in an elevated position at the forward end of the sled embodying arms pivotally connected inwardly of each side rail and a rod connecting the upper ends of the arms to extend transversely of the sled, and spring means acting upon the keeper to normally urge the same into a position for operatively engaging the braking element.

2. The combination with a steerable sled comprising a pair of runners and a steering means embodying spaced superposed links, of a brake for the sled comprising a flexible braking element anchored at its ends to opposite sides of the sled and trained about the sled runners, a keeper pivotally mounted adjacent the forward end of the sled embodying rest portions for engaging the braking element at the forward end of each runner and a cross rod extending between said links, and spring means arranged between the links for normally urging the keeper into holding relation with the braking element.

3. The combination with a steerable hand sled comprising a pair of runners and a steering means embodying a pair of spaced superposed links, of a brake for the sled comprising a flexible braking element having its ends anchored to opposite sides of the sled at a point substantially midway the length of the sled and trained about the sled runners, a keeper pivotally mounted adjacent the forward end of the sled embodying rest portions for releasably engaging the braking element forwardly of the sled runners and a cross rod extending transversely of the sled between said links, and a contractile spring connected at one end to the cross rod between the links and extending longitudinally between the links for attachment at its rear end to a portion of the sled structure.

4. The combination with a steerable hand sled comprising a pair of runners, side rails extending longitudinally above each runner and a steering means embodying a guide bar connecting the forward ends of the runners and side rails and a pair of spaced superposed links, of a brake for the sled comprising a flexible braking element having its ends anchored to opposite sides of the sled and trained about the sled runners, a keeper embodying flattened pivot arms pivotally connected one to the inner side of each side rail and each having an offset rest portion at its lower end for releasably engaging the braking element adjacent the forward end of each side rail, a cross rod connecting the upper ends of the pivot arms and extending between the spaced links, and a spring arranged longitudinally between the links and connected with the cross rod for normally urging the rest portions into holding engagement with the braking element.

5. The combination with a steerable sled comprising a pair of runners and side rails supported above each runner, of a brake for the sled comprising a flexible braking element having its ends anchored to opposite sides of the sled and trained about the sled runners, a keeper pivotally supported between the side rails at their forward ends for releasably engaging the braking element at the forward end of each runner, spring means for normally urging the keeper to a holding position, and trigger means mounted adjacent the rear portion of the sled and operable for actuating the keeper to release the braking element.

6. In combination with a sled embodying a seat and a pair of spaced runners, a flexible braking element connected at its opposite ends to opposite sides of the sled directly beneath the sled seat, a keeper pivotally mounted adjacent the forward end of the sled for normally retaining the braking element in an elevated position above the bearing surfaces of the sled runners, a lever pivotally mounted beneath the seat adjacent the rear end thereof, and a pull wire connecting the lever and keeper whereby the keeper may be actuated upon operation of the lever.

7. In combination with a sled embodying a seat, a pair of spaced runners, and side rails extending longitudinally of each side of the seat, a flexible breaking element connected at its opposite ends to opposite sides of the sled inwardly of said side rails, a keeper pivotally mounted between the side rails adjacent their forward ends for releasably engaging the braking element at the forward end of each runner, a bell crank lever pivotally mounted upon the under side of one of the side rails and having one of its arms arranged inwardly of the side rails, and a pull wire connected to said arm and extending to the keeper for actuation thereof upon operation of the bell crank lever.

JOHN Z. BOUTIN.